March 19, 1935.  W. SCHNEIDER ET AL  1,994,875
PHOTOGRAPHIC FILM FREE FROM HALATION
Filed Oct. 27, 1930
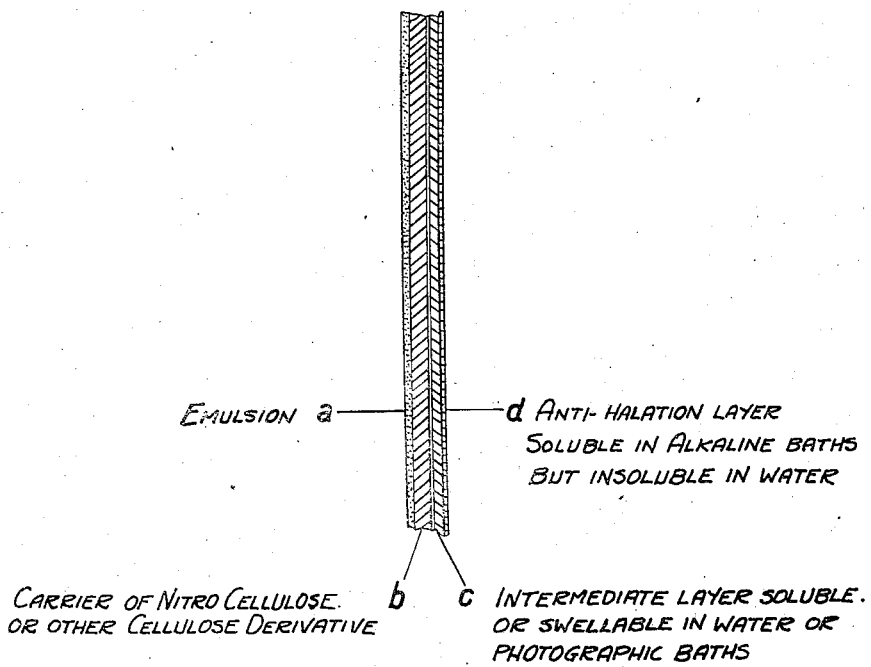

Patented Mar. 19, 1935

1,994,875

UNITED STATES PATENT OFFICE 1,994,875

PHOTOGRAPHIC FILM FREE FROM HALATION

Wilhelm Schneider and Konrad Hebbel, Dessau in Anhalt, Germany, assignors to Agfa Ansco Corporation, Binghamton, N. Y., a corporation of New York Application October 27, 1930, Serial No. 491,619
In Germany November 5, 1929

6 Claims. (Cl. 95—9)

Our present invention relates to new photographic films and more particularly to films free of halation.

Anti-halation layers for photographic plates have been known for a long time past. In general, these layers comprise a colloid as a binding agent and one or more dyes which dissolve either in the photographic developing liquid or in a special bath subsequently used. Of late, attempts have been made to apply such layers to photographic films. This, however, is associated with the difficulty that the dyes of the anti-halation layer penetrate into the film support itself, thus coloring it, and such color cannot perfectly be removed from the film support by means of the usual developing baths. This drawback has particularly been observed in the case of film supports made from nitrocellulose.

According to this invention, the film carrying the emulsion, is protected from being undesirably colored by applying the anti-halation layer not directly to the film but to an intermediate layer of any material which is soluble in or swells in water or in photographic developing baths. The intermediate layer may consist, for instance, of gelatin, an albuminous substance, gum arabic, cherry gum, glucose, a cellulose ether highly sensitive to water, or the like.

The anti-halation layer proper, consisting of one dye or of a mixture of several dyes with or without addition of a binding agent, is applied to the intermediate layer. By the latter any coloration of the film support which might be produced by the dyes contained in the anti-halation layer, becomes practically impossible.

If for rendering the photographic material entirely free from halation, a mixture of dyes is used, one of which does not tend to color permanently the film, this one may, if desired, be incorporated in the intermediate layer.

The following examples illustrate the invention:—

*Example 1.*—On a nitrocellulose film as used for photographic materials, a preparation, for instance, a gelatin layer is applied, which serves to ensure a secure adherence of the following sheets. Thereon, an intermediate layer of about 2–3 $\mu$ thickness is applied, said layer being obtained from a solution containing 200 grams of gum arabic, 5 liters of alcohol and 5 liters of water. In order to obtain a photographic film entirely free from halation, a dye which does not tend to color permanently the nitrocellulose film may be incorporated in this intermediate layer. Thus, for instance, 100 grams of methyl blue (see Schultz, Farbstofftabellen, V$^{th}$ edition, No. 537) may be added to the said solution of gum arabic. When this intermediate layer has dried, an anti-halation layer of 0.5 to 1 $\mu$ thickness, obtained from a solution containing 500 grams of aurine (Schultz, Farbstofftabellen, V$^{th}$ edition, No. 555) and 10 liters of alcohol, is applied thereon. The anti-halation layer thus prepared consists of two layers adhering firmly to the film of which the proper anti-halation layer remote from the film base has a smooth, brilliant surface which is not affected by water. It is soluble in the usual alkaline developers within a short time about 30 to 60 seconds, and the film does not retain any coloration. The intermediate layer is soluble in water.

*Example 2.*—On an acetylcellulose film an intermediate layer of about 2 $\mu$ thickness, obtained from a solution containing 200 grams of glucose, 5 liters of alcohol and 5 liters of water, is applied. After this intermediate layer has dried, it is coated with an anti-halation layer of about 0.5 to 1 $\mu$ thickness made from a solution which contains 40 grams of alkali blue (color acid), (Schultz, Farbstofftabellen, V$^{th}$ edition, No. 536), 750 grams of aurine and 10 liters of alcohol. In the developer the layer is dissolved in 10 to 30 seconds and an entirely clear film remains.

The thickness of the layers may, of course, be varied within wide limits.

The films prepared, for instance, according to the examples, are coated with the photographic emulsion on the side free from the anti-halation layer. In an analogous manner photographic films bearing a photographic emulsion, may be provided with an anti-halation layer of the kind described above.

In the accompanying drawing a photographic film in cross section and in an enlarged scale is shown, illustrating the peculiar features of our invention.

In this drawing $a$ is the photographic emulsion applied to the emulsion carrier $b$, consisting, for instance, of nitrocellulose or another cellulose derivative, $c$ is the intermediate layer soluble or swellable in water or in the photographic baths. $d$ is the anti-halation layer.

What we claim is:—

1. A photographic film comprising a support of nitrocellulose coated on one side with a photographic emulsion and on the other side with an intermediate layer consisting of gum arabic, in which methyl blue is incorporated, said gum arabic layer bearing on its rear surface a layer of aurine.

2. A photographic film comprising a support of acetylcellulose coated on one side with a photographic emulsion and on the other side with an intermediate layer consisting of glucose, the latter being coated on its rear surface with a layer of alkali blue and aurine.

3. A photographic film free from halation and comprising an emulsion carrier consisting of cellulosic material coated on one side with a photographic emulsion and on the other side with an intermediate layer consisting of a water soluble material and on the outer surface of said intermediate layer an anti-halation layer soluble in feebly alkaline baths but insoluble in water.

4. A photographic film free from halation and comprising an emulsion carrier consisting of cellulosic material coated on one side with a photographic emulsion and on the other side with an intermediate layer consisting of a water soluble material and in which is incorporated an anti-halation dye having no affinity for dyeing permanently the cellulosic material, and on the outer surface of said intermediate layer an anti-halation layer soluble in feebly alkaline baths but insoluble in water.

5. A photographic film free from halation and comprising an emulsion carrier consisting of cellulosic material coated on one side with a photographic emulsion and on the other side with an intermediate layer consisting of a water soluble material, and on the outer surface of said intermediate layer an anti-halation layer soluble in the alkaline photographic developers but insoluble in water.

6. A photographic film free from halation and comprising an emulsion carrier consisting of cellulosic material coated on one side with a photographic emulsion and on the other side with an intermediate layer consisting of a water soluble material and in which is incorporated an anti-halation dye having no affinity for dyeing permanently the cellulosic material, and on the outer surface of said intermediate layer an anti-halation layer soluble in the alkaline photographic developers but insoluble in water.

WILHELM SCHNEIDER.
KONRAD HEBBEL.